(12) United States Patent
Llamazares Domper et al.

(10) Patent No.: US 11,377,066 B1
(45) Date of Patent: Jul. 5, 2022

(54) SAFETY SYSTEMS FOR RECLINED SEATS

(71) Applicants: Arturo Llamazares Domper, San Jose, CA (US); Nathaniel J. Dennis, Saratoga, CA (US); Alexander M. Zoellner, Los Gatos, CA (US)

(72) Inventors: Arturo Llamazares Domper, San Jose, CA (US); Nathaniel J. Dennis, Saratoga, CA (US); Alexander M. Zoellner, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/325,625

(22) Filed: May 20, 2021

Related U.S. Application Data

(60) Provisional application No. 63/035,884, filed on Jun. 8, 2020.

(51) Int. Cl.
*B60R 22/20* (2006.01)
*B60R 22/34* (2006.01)
*B60N 2/427* (2006.01)

(52) U.S. Cl.
CPC .......... *B60R 22/205* (2013.01); *B60R 22/341* (2013.01); *B60N 2/42718* (2013.01)

(58) Field of Classification Search
CPC ... B60R 22/205; B60R 22/341; B60R 22/202; B60N 2/42718; B60N 2/42736
See application file for complete search history.

(56) References Cited

U.S. PATENT DOCUMENTS

| 4,343,489 | A |   | 8/1982 | Suzuki et al. |
|---|---|---|---|---|
| 4,765,651 | A |   | 8/1988 | Unger |
| 5,294,184 | A | * | 3/1994 | Blake ............... B60R 22/205 296/68.1 |
| 5,487,562 | A | * | 1/1996 | Hedderly ............ B62D 1/195 188/374 |

(Continued)

FOREIGN PATENT DOCUMENTS

| DE | 2657819 A1 * | 6/1978 |
|---|---|---|
| DE | 19651670 C1 | 2/1998 |

(Continued)

OTHER PUBLICATIONS

ZF Friedrichshafen AG, "Take your seats, buckle up, go!", Autonomous Driving: An Overview, <https://www.zf.com/site/magazine/en/articles_15744.html>, Downloaded Apr. 22, 2021 (4 pp).

*Primary Examiner* — Jonathan Ng
*Assistant Examiner* — Scott F. Underwood
(74) *Attorney, Agent, or Firm* — Young Basile Hanlon & MacFarlane, P.C.

(57) ABSTRACT

A safety system includes a restraint configured to secure an occupant to a seat, an anchor coupled to the restraint and movable along an anchor guide, an anchor energy-absorbing (EA) device configured to control movement of the anchor along the anchor guide, and a controller that includes a processor configured to receive information indicative of an imminent vehicle event, receive information indicative of a recline angle of the seat being above a recline threshold, and send a command to enable the anchor to move along the anchor guide under control of the anchor EA device based on the information indicative of the imminent vehicle event and the recline angle being above the recline threshold.

24 Claims, 7 Drawing Sheets

(56) References Cited

U.S. PATENT DOCUMENTS

| | | |
|---|---|---|
| 5,735,574 A | 4/1998 | Serber |
| 6,334,648 B1 | 1/2002 | Girsberger et al. |
| 6,574,540 B2 | 6/2003 | Yokota et al. |
| 9,399,415 B2 | 7/2016 | Serber |
| 10,518,674 B1 * | 12/2019 | Aikin ........................ B60N 2/14 |
| 2002/0089164 A1 * | 7/2002 | Rouhana ................. B60R 22/02 |
| | | 280/801.1 |
| 2005/0240329 A1 | 10/2005 | Hirota |
| 2016/0264027 A1 | 9/2016 | Alsaif |
| 2018/0056933 A1 * | 3/2018 | Watanabe ............... B60R 22/03 |
| 2019/0118681 A1 | 4/2019 | Daniel et al. |
| 2019/0176749 A1 * | 6/2019 | Jaradi ................. B60R 22/1952 |
| 2019/0225185 A1 | 7/2019 | Ohno et al. |
| 2019/0291688 A1 * | 9/2019 | Hiruta ..................... B60R 22/40 |

FOREIGN PATENT DOCUMENTS

| | | | | |
|---|---|---|---|---|
| DE | 19956530 A1 * | 6/2000 | | ....... B60R 21/01512 |
| DE | 10216107 C1 * | 7/2003 | | ........... B60R 22/203 |
| DE | 102014210166 A1 * | 12/2015 | | ........... B60R 21/013 |
| EP | 0802094 A2 * | 10/1997 | | |
| EP | 1371518 A1 * | 12/2003 | | ........... B60N 2/4221 |
| EP | 1612090 B1 | 8/2009 | | |
| FR | 3018246 B1 | 4/2016 | | |
| FR | 3018247 B1 | 8/2017 | | |
| JP | H11321559 A | 11/1999 | | |

\* cited by examiner

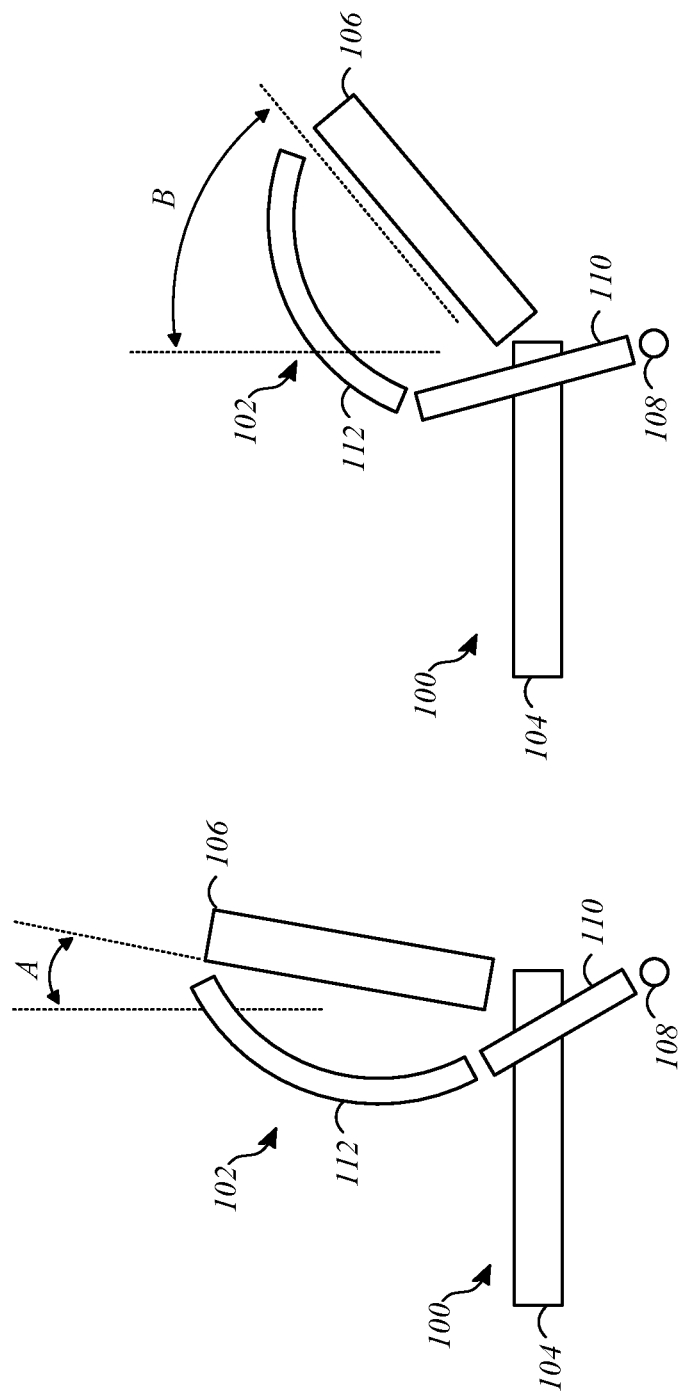

SAFETY SYSTEMS FOR RECLINED SEATS

CROSS-REFERENCE TO RELATED APPLICATION(S)

This application claims priority to U.S. Provisional Application Ser. No. 63/035,884, filed Jun. 8, 2020, entitled "Safety Systems for Reclined Seats," the contents of which are incorporated herein by reference.

TECHNICAL FIELD

This disclosure relates generally to safety systems and specifically to energy-absorbing (EA) devices configured to control motion of various components associated with seating systems.

BACKGROUND

Conventional restraints, for example, seatbelts including lap portions, can include retractors that couple an anchor and belt material to secure an occupant to a seat and to control or limit up-down or z-direction motion of the restrained occupant during certain vehicle events such as rapid decelerations or imminent collisions. Conventional restraints are designed to effect this up-down control for a typical range of seat back positions consistent with upright vehicle operation, that is, positions where a recline angle between a seat back and a seat pan is limited, for example, under 30 degrees.

Design innovations related to interior features within a vehicle cabin are possible. For example, modular interior elements can include seat systems that can be arranged into a configuration consistent with the vehicle cabin serving as a mobile office, a living room, or a relaxation space. In new seating arrangements, occupants may spend time with seat backs partially or full reclined, that is, at a variety of recline angles beyond those typical to conventional vehicle operation. Protecting occupants seated and secured to seat with a higher angle of rotation or recline between the seat pan and the seat back, that is, in deep recline, is a current challenge for safety system designers, as higher recline angles can increase a risk of submarining of an occupant secured to a seat under a variety of vehicle events, such as when the vehicle experiences high rates of acceleration or deceleration or is involved in a collision.

Prohibiting pelvis movement of the occupant to avoid submarining using a conventional restraint, retractor, and anchor can increase a risk of spinal injury based on higher axial and bending forces experienced in the lumbar spine region of an occupant secured to a seat at higher or deeper recline angles. In an example related to axial forces acting upon a spine of an occupant during a vehicle event, the magnitude of axial forces experienced at a recline angle of 45 degrees can be 50% to 75% higher for the same vehicle event when compared to axial forces experienced at a recline angle of 23 degrees. In another example, the magnitude of axial forces experienced at a recline angle of 60 degrees can be 100% to 150% higher for the same vehicle event when compared to axial forces experienced at a recline angle of 23 degrees. Similar relationships to those described for axial forces at various recline angles also exist for flexion or moments acting upon a spine of an occupant during a vehicle event.

SUMMARY

A first aspect of the disclosed embodiments is a safety system. The safety system includes a restraint configured to secure an occupant to a seat, an anchor coupled to the restraint and movable along an anchor guide, an anchor energy-absorbing (EA) device configured to control movement of the anchor along the anchor guide, and a controller that includes a processor configured to receive information indicative of an imminent vehicle event, receive information indicative of a recline angle of the seat being above a recline threshold, and send a command to enable the anchor to move along the anchor guide under control of the anchor EA device based on the information indicative of the imminent vehicle event and the recline angle being above the recline threshold.

In the first aspect, the anchor can be movable along the anchor guide in at least one of a fore-aft direction or an up-down direction in relation to the seat. The processor can be further configured to receive information indicative of the recline angle being below a recline threshold and send a command to prohibit movement of the anchor along the anchor guide based on the information indicative of the recline angle being below the recline threshold. The safety system can include an anchor release mechanism movable between a locked position in which the anchor release mechanism restrains movement of the anchor relative to the anchor guide and an unlocked position in which the anchor release mechanism permits movement of the anchor relative to the anchor guide. The processor can be further configured to send a command to the anchor release mechanism to cause the anchor release mechanism to move from the locked position to the unlocked position based on the information indicative of the imminent vehicle event and the recline angle being above the recline threshold. The recline threshold can be greater than or equal to 45 degrees or greater than or equal to 60 degrees. The anchor EA device can comprise an EA element disposed within the anchor guide and configured to deform above a predetermined load threshold to control movement of the anchor along the anchor guide. The EA element can include notches spaced along a longitudinal axis of the anchor guide. The anchor EA device can comprise a cable coupled to the anchor and configured to payout from a cable guide above a predetermined load threshold to control movement of the anchor along the anchor guide. The cable guide can comprise a spool and a torsion bar configured to control payout of the cable about the spool and along the anchor guide. The cable can comprise a ductile strip and the cable guide comprises barriers configured to deform the ductile stripe to control payout of the ductile strip along the anchor guide. The features described here in respect to the first aspect can be used together or independently in the safety system.

A second aspect of the disclosed embodiments is a safety system. The safety system includes a seat with a seat back positioned in relation to a seat pan at a recline angle, a restraint configured to secure an occupant to the seat, an anchor coupled to the restraint and movable along an anchor guide, an anchor release mechanism configured to prohibit or allow movement of the anchor along the anchor guide, an anchor energy-absorbing (EA) device configured to control movement of the anchor along the anchor guide, and a controller that includes a processor configured to receive information indicative of an imminent collision, receive information indicative of the recline angle being above a recline threshold, and send a command to the anchor release mechanism to allow movement of the anchor along the anchor guide under control of the anchor EA device based on the information indicative of the imminent collision and the recline angle being above the recline threshold.

In the second aspect, the anchor can be movable along the anchor guide in at least one of a fore-aft direction or an up-down direction in relation to the seat. The recline threshold can be greater than or equal to 30 degrees or greater than or equal to 45 degrees. The processor can be further configured to receive information indicative of the recline angle being below the recline threshold and send a command to the anchor release mechanism to prohibit movement of the anchor along the anchor guide based on the information indicative of the recline angle being below the recline threshold. The seat can movable along a seat guide. The safety system can include a seat EA device configured to control movement of the seat in respect to the seat guide. The processor can be further configured to send a command to allow movement of the seat along the seat guide under control of the seat EA device based on the information indicative of the imminent collision and the recline angle being above the recline threshold. The seat pan of the seat can be movable along the seat guide in at least one of a fore-aft direction or an up-down direction in relation to the seat back. The safety system can include a footrest spaced from the seat and the anchor and movable along a footrest guide and a footrest EA device configured to control movement of the footrest along the footrest guide. The processor can be further configured to send a command to allow movement of the footrest along the footrest guide under control of the footrest EA device based on the information indicative of the imminent collision and the recline angle being above the recline threshold. The anchor EA device, the seat EA device, and the footrest EA device can each comprise an EA element configured to deform above a predetermined load threshold to control movement of the anchor, the seat, and the footrest along the anchor guide, the seat guide, and the footrest guide, respectively. The EA element can include notches spaced along a longitudinal axis configured to deform above the predetermined load threshold or a cable configured to payout from a cable guide above the predetermined load threshold. The features described here in respect to the second aspect can be used together or independently in the safety system.

A third aspect of the disclosed embodiments is a method of controlling movement of an occupant in a seat. The method includes receiving, at a controller, information indicative of an imminent vehicle event and indicative of a recline angle of the seat being above a recline threshold. The method includes sending a command, from the controller, to enable an anchor of a restraint associated with the seat to move along an anchor guide under control of an anchor EA device based on the information indicative of the imminent vehicle event and the recline angle being above the recline threshold. The method includes sending a command, from the controller, to enable the seat to move along a seat guide under control of a seat EA device based on the information indicative of the imminent vehicle event and the recline angle being above the recline threshold.

In the third aspect, a seat pan of the seat can be movable along the seat guide in at least one of a fore-aft direction or an up-down direction in relation to a seat back of the seat, and wherein the anchor is movable along the anchor guide in at least one of the fore-aft direction or the up-down direction in relation to the seat. The anchor EA device and the seat EA device can each comprise an EA element configured to deform above a predetermined load threshold to control movement of the anchor and the seat along the anchor guide and the seat guide, respectively. The method can include sending a command, from the controller, to enable a footrest to move along a footrest guide under control of a footrest EA device based on the information indicative of the imminent vehicle event and the recline angle being above the recline threshold. The method can include receiving, at the controller, information indicative of the recline angle of the seat being below the recline threshold, sending a command, from the controller, to prohibit movement of the anchor along the anchor guide based on the information indicative of the recline angle being below the recline threshold, and sending a command, from the controller, to prohibit movement of the seat along the seat guide based on the information indicative of the recline angle being below the recline threshold. The features described here in respect to the third aspect can be used together or independently in the method of controlling movement of the occupant in the seat.

BRIEF DESCRIPTION OF THE DRAWINGS

FIGS. 1A and 1B show a motion diagram for an example of a seat and a restraint for use with a vehicle.

DETAILED DESCRIPTION

Figure 2A:
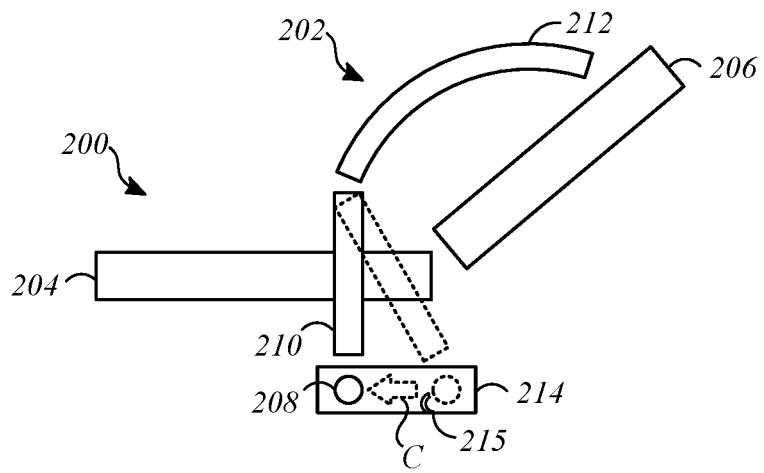
FIGS. 2A, 2B, and 2C show motion diagrams for examples of a safety system for use with a vehicle.

A safety system is disclosed that both prohibits submarining and prevents higher levels of axial and bending forces from acting on an occupant seated at a deep recline prior to or during a vehicle event. To achieve these goals, movement of the occupant in a fore-aft or an x-direction and in an up-down or a z-direction can be controlled using EA devices and the safety systems described herein. The EA devices described can be used with a restraint, a seat pan or entire seat, a footrest, or any combination thereof to discretely manage forces in the fore-aft or x-direction and the up-down or z-direction. The new safety systems allow for control of displacement of a pelvis of an occupant, and thus control of axial and bending forces that act upon a spine of an occupant, while maintaining a sufficient restraint force in the up-down or z-direction to avoid submarining.

FIGS. 1A and 1B show a motion diagram for an example of a seat 100 and a restraint 102 for use with a vehicle (not shown). The seat 100 includes a seat pan 104 and a seat back 106. In FIG. 1A, the seat back 106 is rotated away from or reclined in respect to the seat pan 104 and in respect to a vertical, up-down, or z-direction at a recline angle A as shown. The recline angle A is consistent with a generally upright position for an occupant secured to the seat 100 and can range, for example, from 0 degrees to 30 degrees, from 10 degrees to 40 degrees, etc. The recline angle A can be below a recline threshold, for example, below a 20, 30, or 45 degree threshold generally associated with a mild recline. In FIG. 1B, the seat back 106 is reclined in respect to the seat pan 104 and the vertical, up-down, or z-direction at a recline angle B as shown. The recline angle B is consistent with a deeper recline of an occupant secured to the seat 100 and can range, for example, from 30 to 90 degrees, from 40 to 70 degrees, from 45 to 60 degrees, etc. The recline angle B can be above a recline threshold, for example, above a 30, 45, or 60 degree threshold associated with deep recline.

The restraint 102 is designed to secure an occupant to the seat 100, and in the described examples, the restraint 102 is coupled to a restraint anchor 108 and includes a lap portion 110 and a shoulder portion 112. The restraint anchor 108 can secure the restraint 102 to a portion of the seat 100 or to another structure (not shown) within the vehicle. The restraint anchor 108 can also provide directional guidance for positioning the restraint 102 on the occupant's body. The restraint anchor 108 in FIGS. 1A and 1B can be stationary, that is, fixed to a predetermined position in respect to the seat 100. The seat 100 and the restraint 102 can include additional anchors (not shown), one or more buckles (not shown) to secure and release the restraint 102, and one or more retractors (not shown) that control payout of the portions 110, 112 of the restraint 102 in respect to the restraint anchor 108 during various vehicle events such as rapid deceleration or a vehicle collision. During a vehicle event such as a rapid deceleration or collision, the lap portion 110 of the restraint 102 can extend farther from the restraint anchor 108 in its stationary position when the seat 100 is in deep recline, such as in FIG. 1B, than is the case when the seat 100 is in mild recline, such as in FIG. 1A, increasing a risk for submarining of the occupant. Safety systems to decrease this risk are described herein.

Figure 2B:
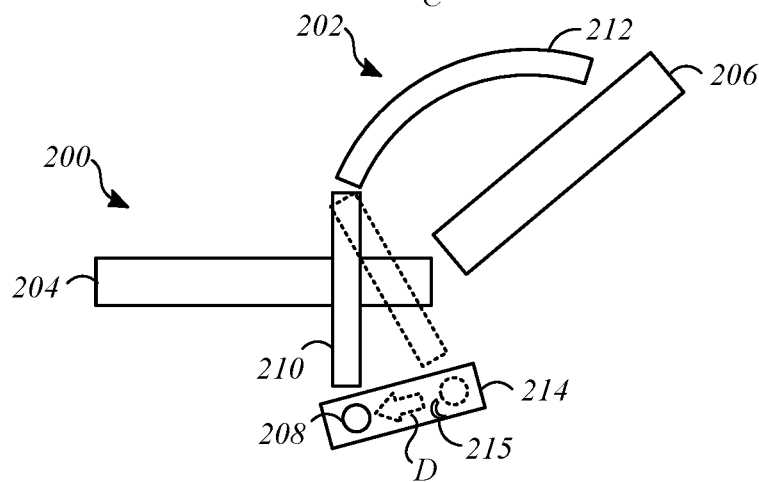
Figure 2C:
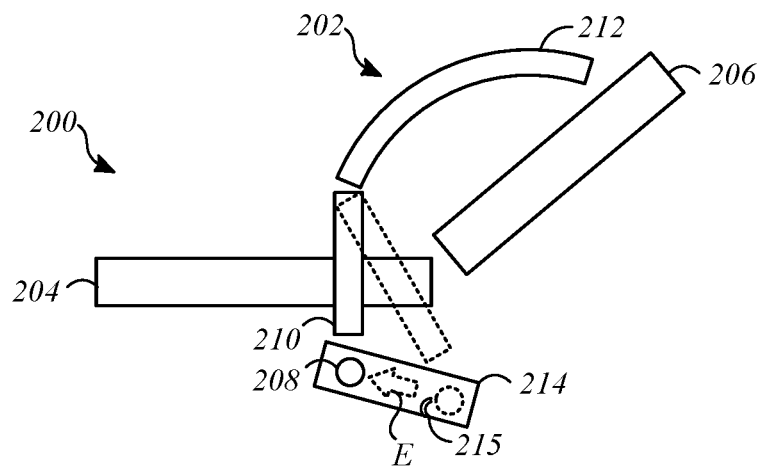

FIGS. 2A, 2B, and 2C show motion diagrams for examples of a safety system for use with a vehicle. The safety system is associated with a seat 200 that includes a seat pan 204 and a seat back 206 rotated in respect to the seat pan 204. In these examples, the seat back 206 is positioned at a deep recline angle such as the angles described in respect to FIG. 1B. A restraint 202 is coupled to an anchor 208 and includes a lap portion 210 and a shoulder portion 212 (shown schematically). The safety system also includes an anchor guide 214 configured to enable the anchor 208 to move in a controlled manner along the anchor guide 214. Movement of the anchor 208 along the anchor guide 214 before or during a vehicle event such as a rapid deceleration or collision can be controlled by an anchor release mechanism 215, by inertia of the vehicle prior to or during the vehicle event, and/or by EA devices such as the EA devices described in respect to FIGS. 4-7.

In operation of the safety system shown in FIGS. 2A, 2B, and 2C, a controller (not shown) can receive information indicative of a vehicle event, such as an imminent collision or rapid deceleration, and information indicative of a recline angle of the seat 200 being above a recline threshold, such as above a 30, 45, 60, or 75 degree threshold. The information can be received from various sensors (not shown) that communicate information to the controller. For example, the sensors can include sensors configured to capture information from an external environment outside of the vehicle cabin. External-sensing sensors can include technologies such as radar, LIDAR, imaging, infrared, or other technologies configured to detect potential or imminent vehicle events such as collisions or rapid decelerations and provide information to the controller to allow a determination of timing of the vehicle event. The sensors can also include sensors internal to the vehicle such as weight sensors, buckle switch sensors, internal cameras, seat position sensors, imaging sensors, etc. that can provide information to the controller.

The controller can send a command, for example, to the anchor release mechanism 215, to allow (or prohibit) movement of the anchor 208 along the anchor guide 214 based on receiving information indicative of the vehicle event and indicative of the recline angle being above (or below) the recline threshold, for example, from the sensors. The anchor release mechanism 215 can be movable between a locked position in which the anchor release mechanism 215 restrains or prohibits movement of the anchor 208 relative to the anchor guide 214 and an unlocked position in which the anchor release mechanism 215 permits or allows movement of the anchor 208 relative to the anchor guide 214. The anchor release mechanism 215 can be implemented such that the anchor 208 is immovable in respect to the anchor guide 214 before and after controlled movement such that the anchor 208 does not return to a pre-movement position after moving before or during a vehicle event.

The anchor release mechanism 215 may be configured as one or more of an electromechanical device, a pyrotechnic device, a pneumatic device, and/or a pre-tensioned spring device. In the case of an electromechanical device, the anchor release mechanism 215 can include an electric motor, a threaded rod, and a threaded guide coupled to a sensor module (not shown) that receives commands. A pyrotechnic device can include an electronically activated pyrotechnic charge which releases a blocking mechanism or severs a restraining device. A pneumatic device can include pressurized gas (or a vacuum) configured to effect movement of a piston (not shown) based on a command. A pre-tensioned spring device can include a spring that is coupled to a sensor module (not shown). The spring can be held in tension until being selectively released, for example, based on a command from the controller (not shown). The anchor release mechanism 215 can also include other mechanisms such as magnetic systems, telescoping systems, cable or tether systems, etc. and movement between the locked and unlocked positions can be designed to be reversible or non-reversible. For example, movement may occur in a single direction with a blocking mechanism (not shown) to stop reverse movement.

In the example of FIG. 2A, a dotted-line arrow C indicates that the anchor 208 can move in a fore-aft or x-direction prior to or during a vehicle event, with motion of the anchor 208 shown in a forward direction prior to or during the vehicle event. Controlled movement of the anchor 208 allows the safety system to control displacement of a lower body or pelvis of an occupant in the fore-aft or x-direction while at the same time maintaining a sufficient up-down or z-direction force (for example, using a retractor, not shown) to secure the occupant to the seat 200 with the restraint 202. Controlling x-direction and z-direction motion and forces can control submarining and limit axial and bending forces experienced in the lumbar spine region of an occupant secured to the seat 200 to ensure occupant safety.

In the example of FIG. 2B, a dotted-line arrow D indicates that the anchor 208 can move in both the fore-aft or x-direction and the up-down or z-direction prior to or during a vehicle event, with motion of the anchor 208 being both in a forward and a downward direction prior to or during the vehicle event. Use of this configuration can be useful if testing of the safety system indicates that up-down or z-direction force generated by the restraint 202 decreases during fore-aft or x-direction translation of the anchor 208.

This is, the safety system can use a downward-sloping anchor guide 214 as shown in FIG. 2B to decrease slack in the lap portion 210 of the restraint during fore-aft or x-direction movement of the anchor 208 and/or to increase the z-direction force of the restraint 202.

In the example of FIG. 2C, a dotted-line arrow E indicates that the anchor 208 can move in both the fore-aft or x-direction and the up-down or z-direction prior to or during a vehicle event, with motion of the anchor 208 being both in a forward and an upward direction prior to or during the vehicle event. Use of this configuration can be useful if testing of the safety system indicates that up-down or z-direction force generated by the restraint 202 increases during fore-aft or x-direction translation of the anchor 208. This is, the safety system can use an upward-sloping anchor guide 214 as shown in FIG. 2C to increase slack in the lap portion 210 of the restraint during fore-aft or x-direction movement of the anchor 208 and/or decrease the z-direction force of the restraint 202.

Figure 3A:
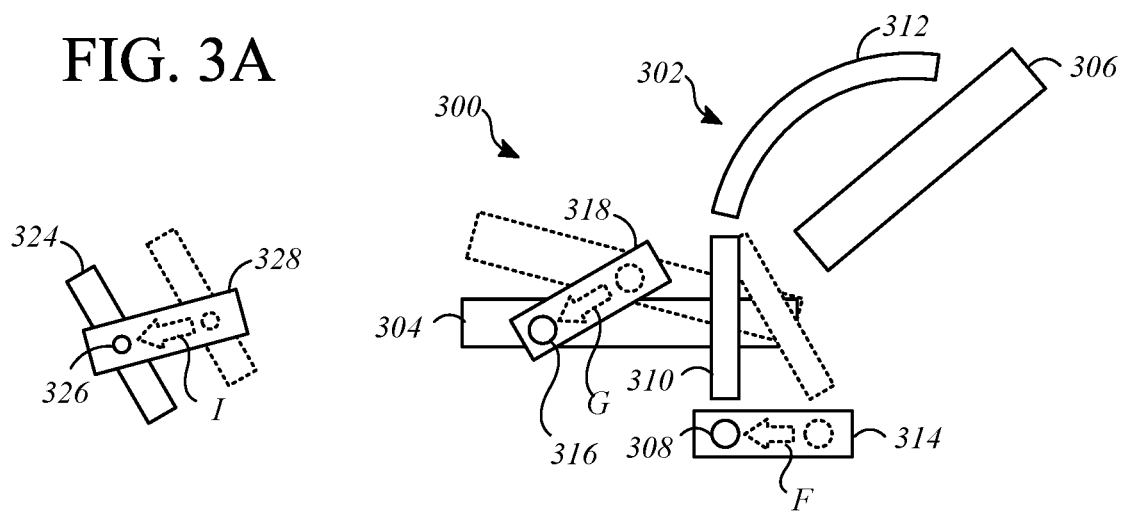
FIGS. 3A and 3B show motion diagrams for additional examples of a safety system for use with a vehicle.
Figure 3B:
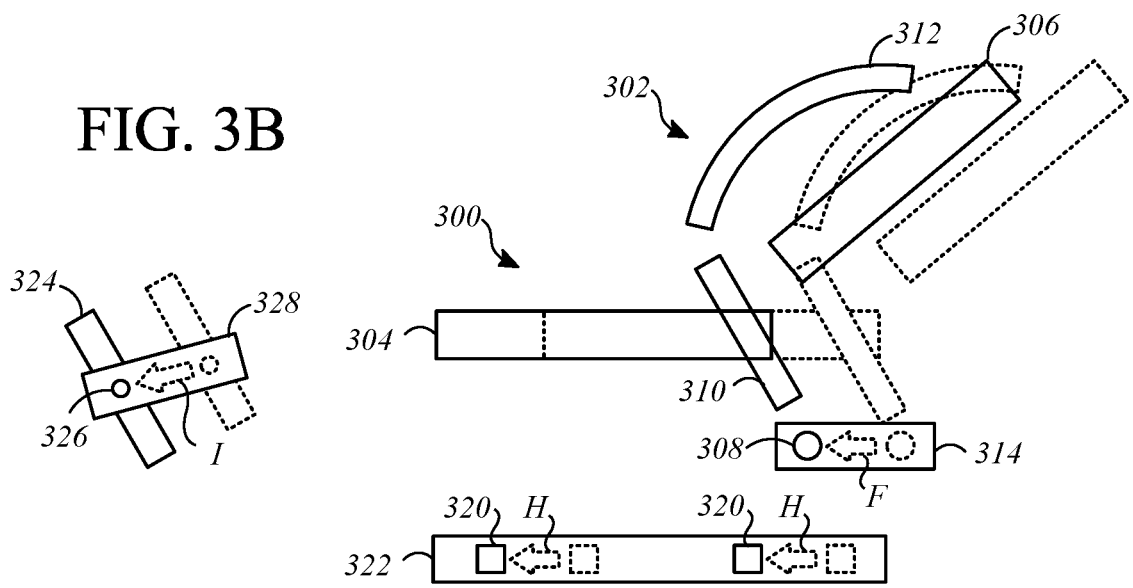

FIGS. 3A and 3B show motion diagrams for additional examples of a safety system for use with a vehicle. In these examples, the safety system is associated with a seat 300 that includes a seat pan 304 and a seat back 306 rotated in respect to the seat pan 304. The seat back 306 can be positioned at a deep recline angle such as the recline angles described in respect to FIGS. 1B-2C. A restraint 302 is coupled to a restraint anchor 308 and includes a lap portion 310 and a shoulder portion 312 (shown schematically).

The safety system of FIGS. 3A and 3B includes a restraint anchor guide 314 configured to enable the restraint anchor 308 to move in a controlled manner along the restraint anchor guide 314. The restraint anchor 308 and the restraint anchor guide 314 can function in a similar manner as described in respect to the anchor 208 and the anchor guide 214 of FIGS. 2A, 2B, and 2C, with a dotted-line arrow F indicating fore-aft movement of the restraint anchor 308, for example, in response to a command from a controller (not shown). Though positioned in this example to allow fore-aft or x-direction movement, the restraint anchor guide 314 can also be positioned to allow up-down or z-direction movement as described in respect to the anchor guide 214 of FIGS. 2B and 2C.

The safety system of FIG. 3A also includes a seat anchor 316 associated with the seat pan 304 and moveable within a seat guide 318. The safety system of FIG. 3B includes seat anchors 320 associated with the seat 300 and moveable within a seat guide 322. The seat anchors 316, 320 are configured to enable the seat pan 304 (FIG. 3A) or the seat 300 (FIG. 3B) to move in a controlled manner along the respective seat guides 318, 322, and though described as anchors, a variety of electromechanical, pyrotechnic, mechanical, hydraulic, or other mechanisms may be used to control motion of the seat pan 304 or the seat 300. Movement of the seat pan 304 or the seat 300 in respect to the respective seat guides 318, 322 before or during a vehicle event such as a rapid deceleration or imminent collision can be controlled by a seat release mechanism (not shown), by inertia of the vehicle, and/or by EA devices such as the EA devices described in respect to FIGS. 4-7. The seat guide 318 is positioned in the example of FIG. 3A to allow up-down or z-direction movement and fore-aft or x-direction movement of the seat anchor 316 and the seat pan 304. The seat guide 322 is positioned in the example of FIG. 3B to allow fore-aft or x-direction movement of the seat anchors 320 and the seat 300.

Movement of the seat pan 304 or the seat 300 prior to or during a vehicle event can be used either alone or in combination with movement of the restraint anchor 308. For example, when the seat 300 has a deep recline angle as shown in FIGS. 3A and 3B, the seat pan 304 may act as a reaction surface to generate axial forces that act on the lumbar spine region of an occupant during a vehicle event. Strain in the lumbar spine region can be significantly reduced by allowing movement of the seat pan 304 as shown using a dotted-line arrow G that indicates both up-down or z-direction movement and fore-aft or x-direction movement of the seat anchor 316 and the seat pan 304, for example, in response to a command from a controller (not shown). For a recline angle of approximately 60 degrees, axial and bending loads can be reduced by over 20%, over 30%, or over 40% for a given vehicle event using the described movement of the seat anchor 316 and the seat pan 304 as compared to a fixed seat pan 304.

In another example shown in FIG. 3B, movement of the restraint anchor 308 can occur together with movement of the seat anchors 320 along the seat guide 322 to move both the restraint 302 and the seat 300 prior to or during a vehicle event. A dotted-line arrow H indicates fore-aft or x-direction movement of the seat anchors 320 and the seat 300 to further improve anti-submarining capabilities of the safety system before or during a vehicle event. The safety system in FIG. 3B can also be used to reduce a total distance of travel for the restraint anchor 308 and/or the seat anchors 320 along the restraint anchor guide 314 and/or the seat guide 322 by over 20%, over 30%, or over 40% as compared to movement of either the restraint anchor 308 or the seat anchors 320 alone, improving packaging for the safety system.

The safety system of FIGS. 3A and 3B also includes a footrest 324. The footrest 324 is shown schematically as including or coupled to a footrest anchor 326 movable along a footrest guide 328. The footrest anchor 326 is configured to enable the footrest 324 to move in a controlled manner along the footrest guide 328, and though described as an anchor, a variety of electromechanical, mechanical, hydraulic, or other mechanisms may be used to control motion of the footrest 324. Movement of the footrest 324 in respect to the footrest guide 328 before or during a vehicle event such as a rapid deceleration or an imminent collision can be controlled by a footrest release mechanism (not shown), by inertia of the vehicle, and/or by EA devices such as the EA devices described in respect to FIGS. 4-7. The footrest guide 328 is positioned in the examples of FIGS. 3A and 3B to allow both an up-down or z-direction movement and a fore-aft or x-direction movement of the footrest 324.

Movement of the footrest 324 prior to or during a vehicle event can be used either alone or in combination with movement of the restraint anchor 308, movement of the seat pan 304, and/or movement of the seat 300 to limit axial and bending forces experienced in the legs and the lumbar spine region of an occupant secured to the seat 300 and using the footrest 324. For example, the footrest 324 can act to generate axial forces on the feet and/or legs of an occupant during a vehicle event. Strain in the legs can be significantly reduced by allowing movement of the footrest 324 as shown using a dotted-line arrow I that indicates both an up-down or a z-direction movement and a fore-aft or an x-direction movement of the footrest anchor 326 and the footrest 324, for example, in response to a command from a controller (not shown).

Figure 4:
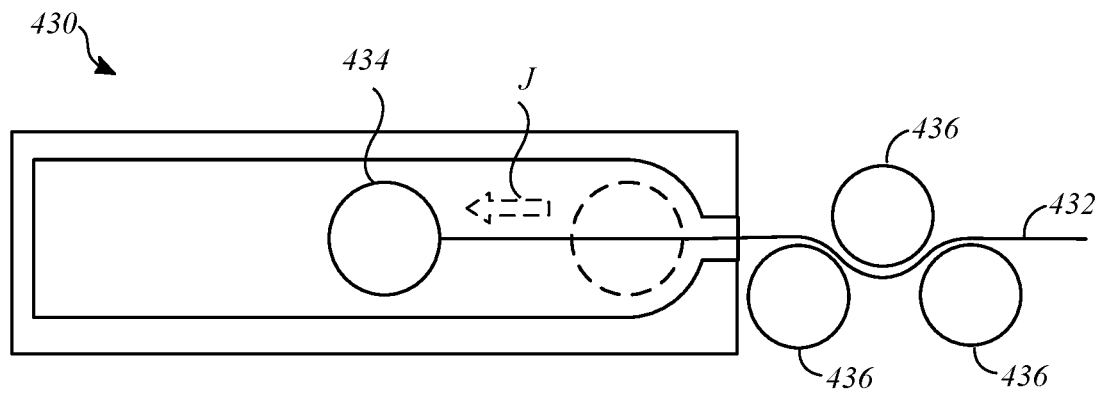
FIG. 4 shows a motion diagram for an example of an energy-absorbing (EA) device for use with any of the safety systems of FIGS. 2A to 3C.

FIG. 4 shows a motion diagram for an example of an EA device 430 for use with any of the safety systems of FIGS. 2A to 3B. The EA device 430 can be used to control or dampen movement during a vehicle event such as a rapid deceleration or a collision and can serve as part of or be otherwise associated with the anchor 208 moving along the anchor guide 214, the restraint anchor 308 moving along the restraint anchor guide 314, the seat anchors 316, 320 moving along the respective seat guides 318, 322, and/or the footrest anchor 326 moving along the footrest guide 328. The EA device 430 includes a ductile strip 432 that is attached to an anchor point 434 and routed through a series of barriers 436 configured to plastically deform the ductile strip 432 upon reaching a tunable force or predetermined load threshold for payout of the ductile strip 432. Motion or payout of the anchor point 434 is indicated using a dotted-line arrow J. Motion of the anchor point 434 can occur after the tunable force or predetermined load threshold is met or in response to a command received from a controller.

Figure 5:
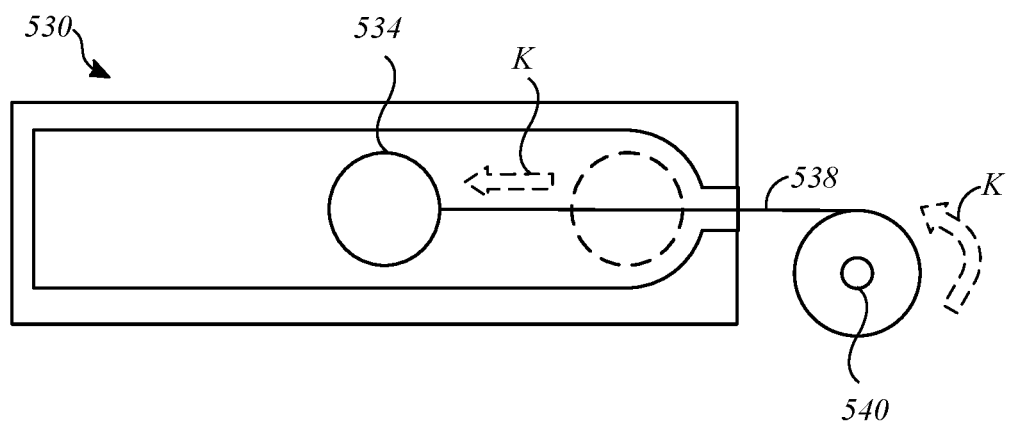
FIG. 5 shows a motion diagram for another example of an EA device for use with any of the safety systems of FIGS. 2A to 3C.

FIG. 5 shows a motion diagram for another example of an EA device 530 for use with any of the safety systems of FIGS. 2A to 3B. The EA device 530 can be used to control or dampen movement during a vehicle event such as a rapid deceleration or a collision and can serve as part of or be otherwise associated with the anchor 208 moving along the anchor guide 214, the restraint anchor 308 moving along the restraint anchor guide 314, the seat anchors 316, 320 moving along the respective seat guides 318, 322, and/or the footrest anchor 326 moving along the footrest guide 328. The EA device 530 includes a cable 538 or other tension carrying member that is coupled to an anchor point 534 and coiled around a cable guide 540 such as a spool with a torsion bar (not shown) used to control the tunable force or predetermined load threshold for payout of the cable 538. Motion or payout of the anchor point 534 is indicated using dotted-line arrows K. Motion of the anchor point 534 can occur after the tunable force or predetermined load threshold is met or in response to a command to allow movement received from a controller.

Figure 6:
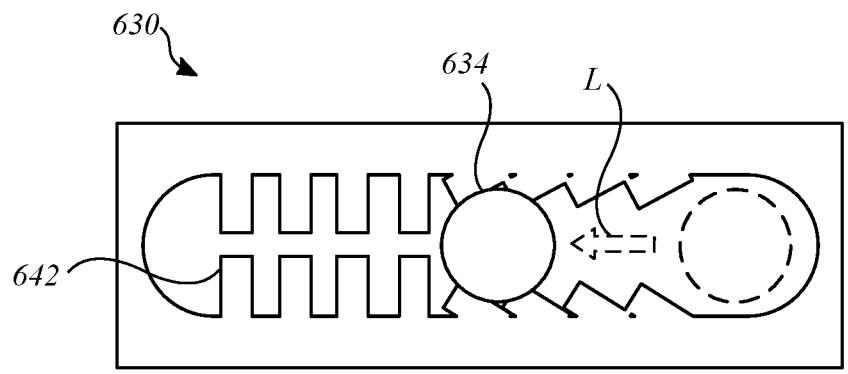
FIG. 6 shows a motion diagram for another example of an EA device for use with any of the safety systems of FIGS. 2A to 3C.

FIG. 6 shows a motion diagram for another example of an EA device 630 for use with any of the safety systems of FIGS. 2A to 3B. The EA device 630 can be used to control or dampen movement during a vehicle event such as a rapid deceleration or a collision and can serve as part of or be otherwise associated with the anchor 208 moving along the anchor guide 214, the restraint anchor 308 moving along the restraint anchor guide 314, the seat anchors 316, 320 moving along the respective seat guides 318, 322, and/or the footrest anchor 326 moving along the footrest guide 328. The EA device 630 includes an EA element in the form of notches 642 designed with a tunable force or predetermined load threshold at which deformation in the form or compression or bending occurs. In this manner, the notches 642 control movement of an anchor point 634 as the anchor point 634 passes each subsequent compressed or bent notch 642 as indicated using a dotted-line arrow L. Motion of the anchor point 634 can occur after the tunable force or predetermined load threshold is met or in response to a command to allow movement received from a controller.

Figure 7:
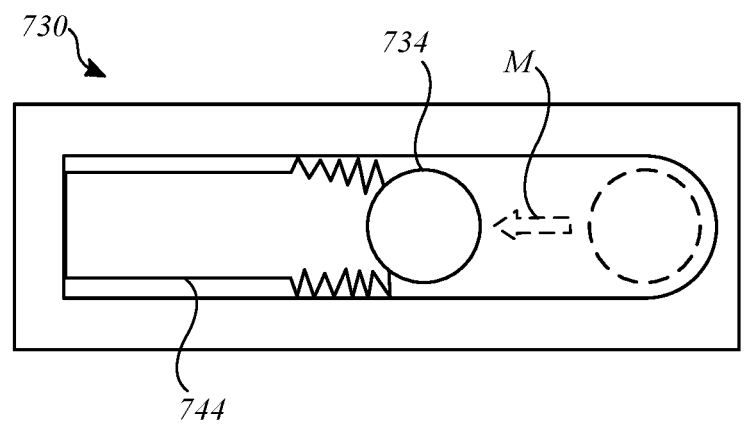
FIG. 7 shows a motion diagram for another example of an EA device for use with any of the safety systems of FIGS. 2A to 3C.

FIG. 7 shows a motion diagram for another example of an EA device 730 for use with any of the safety systems of FIGS. 2A to 3B. The EA device 730 can be used to dampen movement during a vehicle event such as a rapid deceleration or a collision and can serve as part of or be otherwise associated with the anchor 208 moving along the anchor guide 214, the restraint anchor 308 moving along the restraint anchor guide 314, the seat anchors 316, 320 moving along the respective seat guides 318, 322, and/or the footrest anchor 326 moving along the footrest guide 328. The EA device 730 includes an EA element in the form of a deformable element 744 such as a honeycomb member, a deformable tube, or other extruded member with a tunable force or predetermined load threshold at which deformation in the form or compression or crumpling occurs. In this manner, the deformable element 744 controls movement of an anchor point 734 with motion of the anchor point 734 indicated using a dotted-line arrow M. Motion of the anchor point 734 can occur after the tunable force or predetermined load threshold is met or in response to a command to allow movement received from a controller.

The tunable force or predetermined load threshold described in respect to the EA devices 430, 530, 630, 730 can be based on or associated with various inputs related to the vehicle or a vehicle event such as a rapid deceleration or an imminent collision. For example, the tunable force or predetermined load threshold can be based on inputs to a controller (not shown) such as vehicle speed, occupant mass, occupant height, occupant position in the seat 200, 300, position of the seat back 206, 306, type of vehicle event, location of vehicle event, time to vehicle event, etc. The controller can be configured to set or change the tunable force or predetermined load threshold based on an assessment of occupant features upon the occupant entering or approaching the vehicle, prior to a vehicle event, for example, within hundreds of milliseconds prior to an imminent collision, or after a vehicle event is detected, for example, using a mechanism configured to activate in under five, ten, or twenty milliseconds.

A command can be sent to a release mechanism or other mechanism (not shown) associated with the EA devices 430, 530, 630, 730 in order to initiate controlled deformation or payout at the tunable force or predetermined load threshold. The release mechanism or other mechanism can be pyrotechnic, electromechanical, pneumatic, mechanical, reversible, or non-reversible. For example, deformation or payout may occur in a single direction with a blocking mechanism (not shown) to stop reverse movement. The release mechanism or other mechanism can be absent, that is, the EA devices 430, 530, 630, 730 can be designed for inertia to trigger deformation above the tunable force or predetermined load threshold. The EA devices 430, 530, 630, 730 can also be controlled or otherwise inhibited such that no deformation or payout occurs if a recline angle associated with the seat 200, 300 is below a recline threshold, such as below a 30, 45, or 60 degree recline threshold. In other words, movement of the anchor points 434, 534, 634, 734 under control of the described EA devices 430, 530, 630, 730 may be prohibited unless predetermined conditions such as an imminent vehicle event and a deep recline angle above the predetermined recline threshold are met.

Figure 8:
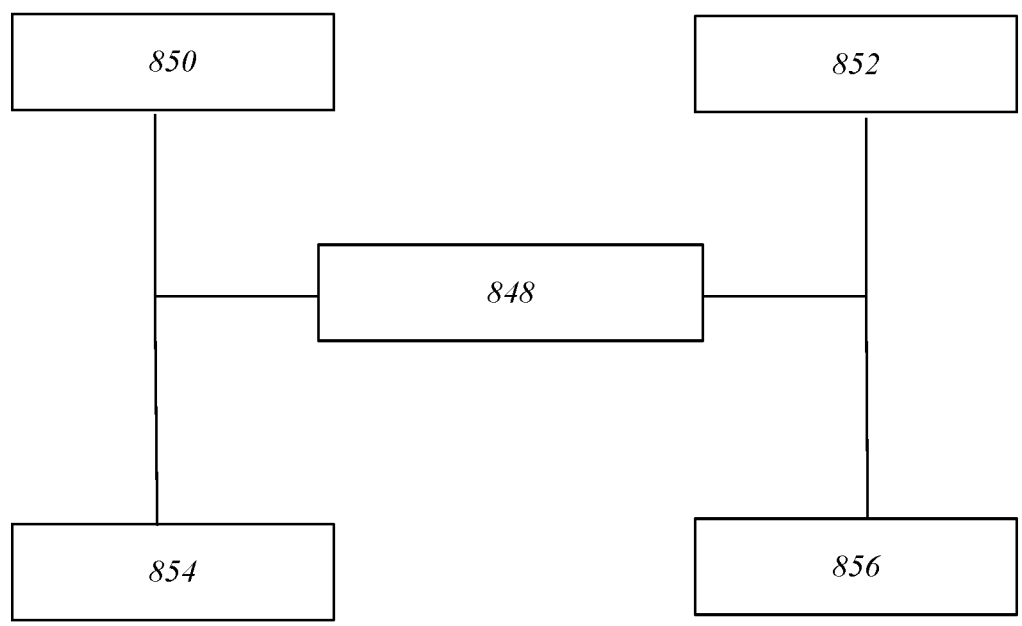
FIG. 8 is a block diagram of a safety system.

FIG. 8 is a block diagram that shows a safety system 846. The safety system 846 can include a controller 848, sensors 850, an anchor system 852, a seat system 854, and a footrest system 856. The anchor system 852 can include components and operate in a manner similar to the restraints 202, 302, the anchor 208, the anchor guide 214, the restraint anchor 308, and the restraint anchor guide 314 described in reference to FIGS. 2A-3B. The seat system 854 can include components and operate in a manner similar to the seats 200, 300, the seat pans 204, 304, the seat backs 206, 306, the seat anchors 316, 320, and the seat guides 318, 322 described in reference to FIGS. 2A-3B. The footrest system 856 can include components and operate in a manner similar to the footrest 324, the footrest anchor 326, and the footrest guide 328 described in reference to FIGS. 3A-3B. The safety system 846 is shown as including the anchor system 852, the seat system 854, and the footrest system 856, but one or more of these components may be absent from the safety system 846 and the other components can continue to operate in the manner previously described.

The controller 848 coordinates operation of the safety system 846 by communicating electronically (e.g., using wired or wireless communications) with the sensors 850, the anchor system 852, the seat system 854, and the footrest system 856. The controller 848 may receive information (e.g., signals, information, and/or data) from the sensors 850 and may receive information from and/or send information to other portions of the safety system 846 such as the anchor system 852, the seat system 854, the footrest system 856, or other portions (not shown).

The sensors 850 may capture or receive information related, for example, to components of the safety system 846 and from an external environment where the safety system 846 is located. The external environment can be an exterior of a vehicle or an interior of a vehicle. Information captured or received by the sensors 850 can relate to seats, anchors, footrests, occupants within a vehicle, other vehicles, pedestrians and/or objects in the external environment, operating conditions of the vehicle, operating conditions or trajectories of other vehicles, and/or other conditions within the vehicle or exterior to the vehicle.

The safety system 846 can change an operational mode of the anchor system 852, the seat system 854, and/or the footrest system 856 based on a control signal, such as a signal from the controller 848. The control signal may be based on information captured or received by the sensors 850 and may cause various components within the safety system 846 to change between various operational modes.

For example, a control signal can cause the anchor system 852 to change from a first operational mode where an anchor point of a restraint is held in a fixed position to a second operational mode where the anchor point is moveable in relation to an anchor guide. In another example, a control signal can cause the seat system 854 to change from a first operational mode where a seat pan is held in a fixed position in relation to a seat back to a second operational mode where the seat pan is movable in relation to a seat guide and in relation to the seat back. In another example, a control signal can cause the footrest system 856 to change from a first operational mode where a footrest is held in a fixed position to a second operational mode where the footrest is moveable in relation to a footrest guide.

Various technologies may be used to implement the safety system 846. For example, the anchor release mechanism 215 of FIGS. 2A to 2C, the EA devices 430, 530, 630, 730 of FIGS. 4-7, or other electromechanical devices, pneumatic devices, pre-tensioned spring devices, magnetic systems, telescoping systems, cable or tether systems, etc. can all be used to implement motion control within the safety system 846.

Figure 9:
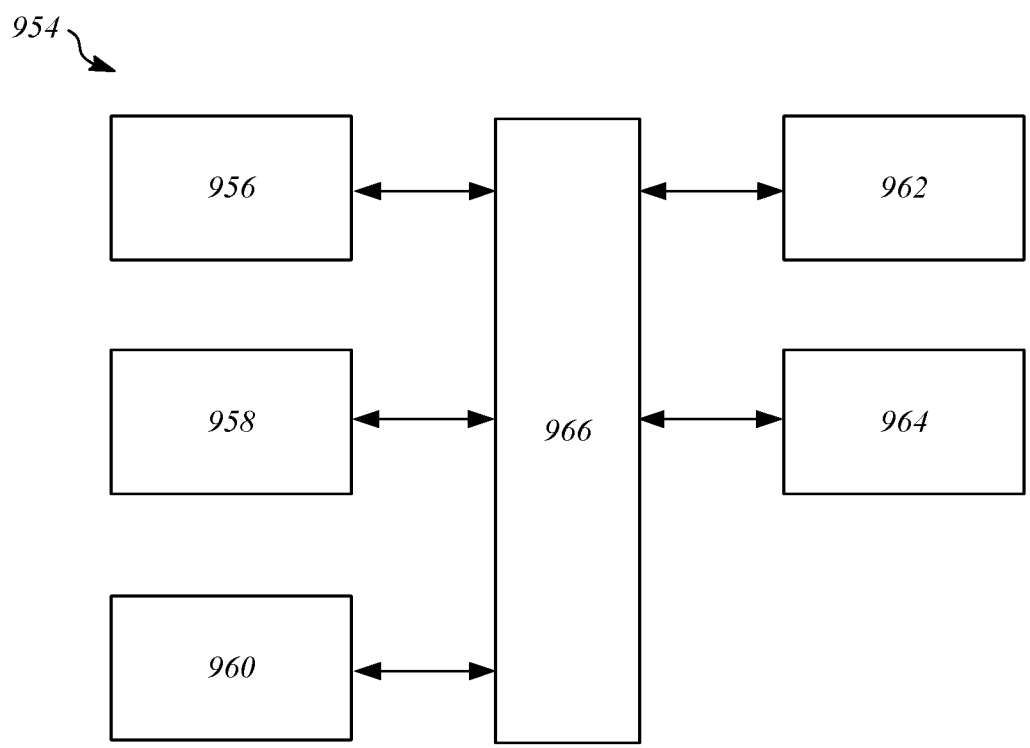
FIG. 9 is an illustration of a hardware configuration for a controller.

FIG. 9 shows an example of a hardware configuration for a controller 954 that may be used to implement the controller 848 and/or other portions of the safety system 846. In the illustrated example, the controller 954 includes a processor 956, a memory device 958, a storage device 960, one or more input devices 962, and one or more output devices 964. These components may be interconnected by hardware such as a bus 966 that allows communication between the components.

The processor 956 may be a conventional device such as a central processing unit and is operable to execute computer program instructions and perform operations described by the computer program instructions. The memory device 958 may be a volatile, high-speed, short-term information storage device such as a random-access memory module. The storage device 960 may be a non-volatile information storage device such as a hard drive or a solid-state drive. The input devices 962 may include sensors and/or any type of human-machine interface, such as buttons, switches, a keyboard, a mouse, a touchscreen input device, a gestural input device, or an audio input device. The output devices 964 may include any type of device operable to send commands associated with an operating mode or state or provide an indication to a user regarding an operating mode or state, such as a display screen, an interface for a safety system such as the safety system 846, or an audio output.

As described above, one aspect of the present technology is the gathering and use of data available from various sources, such as from sensors 850 or user profiles, to improve the function of safety systems such as the safety system 846. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to operational modes of safety systems to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in safety systems can be implemented for a given user by inferring user preferences or user status based on non-personal information data, a bare minimum amount of personal information, other non-personal information available to the system, or publicly available information.

What is claimed is:

1. A safety system, comprising:
   a restraint configured to secure an occupant to a seat;
   an anchor coupled to the restraint and movable along an anchor guide;
   an anchor energy-absorbing (EA) device configured to control movement of the anchor along the anchor guide; and
   a controller that includes a processor configured to:
     receive information indicative of an imminent vehicle event;
     receive information indicative of a recline angle of the seat being above a recline threshold; and
     send a command to enable the anchor to move along the anchor guide under control of the anchor EA device based on the information indicative of the imminent vehicle event and the recline angle being above the recline threshold.

2. The safety system of claim 1, wherein the anchor is movable along the anchor guide in at least one of a fore-aft direction or an up-down direction in relation to the seat.

3. The safety system of claim 1, wherein the processor is further configured to:
   receive information indicative of the recline angle being below the recline threshold; and
   send a command to prohibit movement of the anchor along the anchor guide based on the information indicative of the recline angle being below the recline threshold.

4. The safety system of claim 1, further comprising:
   an anchor release mechanism movable between a locked position in which the anchor release mechanism restrains movement of the anchor relative to the anchor guide and an unlocked position in which the anchor release mechanism permits movement of the anchor relative to the anchor guide,
   wherein the processor is further configured to send a command to the anchor release mechanism to cause the anchor release mechanism to move from the locked position to the unlocked position based on the information indicative of the imminent vehicle event and the recline angle being above the recline threshold.

5. The safety system of claim 1, wherein the recline threshold is greater than or equal to 45 degrees or greater than or equal to 60 degrees.

6. The safety system of claim 1, wherein the anchor EA device comprises an EA element disposed within the anchor guide and configured to deform above a predetermined load threshold to control movement of the anchor along the anchor guide.

7. The safety system of claim 6, wherein the EA element includes notches spaced along a longitudinal axis of the anchor guide.

8. The safety system of claim 1, wherein the anchor EA device comprises a cable coupled to the anchor and configured to payout from a cable guide above a predetermined load threshold to control movement of the anchor along the anchor guide.

9. The safety system of claim 8, wherein the cable guide comprises a spool and a torsion bar configured to control payout of the cable about the spool and along the anchor guide.

10. The safety system of claim 8, wherein the cable comprises a ductile strip and the cable guide comprises barriers configured to deform the ductile stripe to control payout of the ductile strip along the anchor guide.

11. A safety system, comprising:
    a seat comprising a seat back positioned in relation to a seat pan at a recline angle;
    a restraint configured to secure an occupant to the seat;
    an anchor coupled to the restraint and movable along an anchor guide;
    an anchor release mechanism configured to prohibit or allow movement of the anchor along the anchor guide;
    an anchor energy-absorbing (EA) device configured to control movement of the anchor along the anchor guide; and
    a controller that includes a processor configured to:
      receive information indicative of an imminent collision;
      receive information indicative of the recline angle being above a recline threshold; and
      send a command to the anchor release mechanism to allow movement of the anchor along the anchor guide under control of the anchor EA device based on the information indicative of the imminent collision and the recline angle being above the recline threshold.

12. The safety system of claim 11, wherein the anchor is movable along the anchor guide in at least one of a fore-aft direction or an up-down direction in relation to the seat.

13. The safety system of claim 11, wherein the recline threshold is greater than or equal to 30 degrees or greater than or equal to 45 degrees.

14. The safety system of claim 11, wherein the processor is further configured to:
receive information indicative of the recline angle being below the recline threshold; and
send a command to the anchor release mechanism to prohibit movement of the anchor along the anchor guide based on the information indicative of the recline angle being below the recline threshold.

15. The safety system of claim 11, wherein the seat is movable along a seat guide, further comprising:
a seat EA device configured to control movement of the seat in respect to the seat guide,
wherein the processor is further configured to send a command to allow movement of the seat along the seat guide under control of the seat EA device based on the information indicative of the imminent collision and the recline angle being above the recline threshold.

16. The safety system of claim 15, wherein the seat pan of the seat is movable along the seat guide in at least one of a fore-aft direction or an up-down direction in relation to the seat back.

17. The safety system of claim 15, further comprising:
a footrest spaced from the seat and the anchor and movable along a footrest guide; and
a footrest EA device configured to control movement of the footrest along the footrest guide,
wherein the processor is further configured to send a command to allow movement of the footrest along the footrest guide under control of the footrest EA device based on the information indicative of the imminent collision and the recline angle being above the recline threshold.

18. The safety system of claim 17, wherein the anchor EA device, the seat EA device, and the footrest EA device each comprise an EA element configured to deform above a predetermined load threshold to control movement of the anchor, the seat, and the footrest along the anchor guide, the seat guide, and the footrest guide, respectively.

19. The safety system of claim 18, wherein the EA element includes notches spaced along a longitudinal axis configured to deform above the predetermined load threshold or a cable configured to payout from a cable guide above the predetermined load threshold.

20. A method of controlling movement of an occupant in a seat, comprising:
receiving, at a controller, information indicative of an imminent vehicle event and indicative of a recline angle of the seat being above a recline threshold;
sending a command, from the controller, to enable an anchor of a restraint associated with the seat to move along an anchor guide under control of an anchor EA device based on the information indicative of the imminent vehicle event and the recline angle being above the recline threshold; and
sending a command, from the controller, to enable the seat to move along a seat guide under control of a seat EA device based on the information indicative of the imminent vehicle event and the recline angle being above the recline threshold.

21. The method of claim 20, wherein a seat pan of the seat is movable along the seat guide in at least one of a fore-aft direction or an up-down direction in relation to a seat back of the seat, and wherein the anchor is movable along the anchor guide in at least one of the fore-aft direction or the up-down direction in relation to the seat.

22. The method of claim 20, wherein the anchor EA device and the seat EA device each comprise an EA element configured to deform above a predetermined load threshold to control movement of the anchor and the seat along the anchor guide and the seat guide, respectively.

23. The method of claim 20, further comprising:
sending a command, from the controller, to enable a footrest to move along a footrest guide under control of a footrest EA device based on the information indicative of the imminent vehicle event and the recline angle being above the recline threshold.

24. The method of claim 20, further comprising:
receiving, at the controller, information indicative of the recline angle of the seat being below the recline threshold;
sending a command, from the controller, to prohibit movement of the anchor along the anchor guide based on the information indicative of the recline angle being below the recline threshold; and
sending a command, from the controller, to prohibit movement of the seat along the seat guide based on the information indicative of the recline angle being below the recline threshold.

* * * * *

UNITED STATES PATENT AND TRADEMARK OFFICE
CERTIFICATE OF CORRECTION

PATENT NO. : 11,377,066 B1
APPLICATION NO. : 17/325625
DATED : July 5, 2022
INVENTOR(S) : Arturo Llamazares Domper, Nathaniel J. Dennis and Alexander M. Zoellner It is certified that error appears in the above-identified patent and that said Letters Patent is hereby corrected as shown below:

In the Specification

At Column 2, Line number 47, "ductile stripe" should be --ductile strip--.

In the Claims

At Column 14, Claim number 10, Line number 47, "ductile stripe" should be --ductile strip--.

Signed and Sealed this
Twentieth Day of September, 2022

*Katherine Kelly Vidal*

Katherine Kelly Vidal
*Director of the United States Patent and Trademark Office*